United States Patent
Chang et al.

(10) Patent No.: US 10,603,634 B1
(45) Date of Patent: Mar. 31, 2020

(54) EMISSION CONTROL SYSTEM

(71) Applicant: DENSO International America, Inc., Southfield, MI (US)

(72) Inventors: Han-Yuan Chang, Ann Arbor, MI (US); Nicholas Polcyn, Commerce, MI (US); Hiroki Nogami, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/162,952

(22) Filed: Oct. 17, 2018

(51) Int. Cl.
  *F01N 3/20* (2006.01)
  *B01D 53/94* (2006.01)
  *F01N 3/02* (2006.01)

(52) U.S. Cl.
  CPC ..... *B01D 53/9454* (2013.01); *B01D 53/9481* (2013.01); *F01N 3/2093* (2013.01); *F01N 3/0205* (2013.01); *F01N 2240/16* (2013.01); *F01N 2250/12* (2013.01)

(58) Field of Classification Search
  CPC .. F01N 3/0864; F01N 11/007; F01N 2570/16; F01N 2900/1624
  See application file for complete search history.

(56) References Cited

U.S. PATENT DOCUMENTS

| | | | |
|---|---|---|---|
| 9,328,681 B2 | 5/2016 | Takada et al. | |
| 9,334,822 B2 | 5/2016 | Shimojo et al. | |
| 9,732,691 B2 | 8/2017 | Okazaki et al. | |
| 2008/0184697 A1* | 8/2008 | Kojima | F01N 3/0814 60/286 |
| 2017/0089280 A1* | 3/2017 | Santillo | F01N 3/08 |

* cited by examiner

*Primary Examiner* — Jonathan R Matthias
(74) *Attorney, Agent, or Firm* — Harness, Dickey & Pierce, P.L.C.

(57) ABSTRACT

A vehicle includes an engine, a fueling system, an exhaust assembly, and a controller. The fueling system controls fuel to the engine. The exhaust assembly releases combustion gas from the engine and includes at least one sensor and a catalytic converter. The controller is configured to control the engine, the fueling system and the exhaust assembly. The controller evaluates engine state and an output from the at least one sensor and commands a fueling strategy to control an oxygen storage capacity of the catalytic converter based on the engine state and output from the at least one sensor.

20 Claims, 7 Drawing Sheets

EMISSION CONTROL SYSTEM

FIELD

The present disclosure relates to an emission control system, and, more particularly, to an emission control system that utilizes a downstream Universal Heated Exhaust Gas Oxygen sensor.

BACKGROUND

This section provides background information related to the present disclosure which is not necessarily prior art.

Internal combustion engines ("ICEs") typically draw ambient air into a combustion chamber where the air and a fuel are compressed by a compression device, such as a piston-cylinder for example, and ignited to cause combustion of the air-fuel mixture. The combustion gases generally expand to do work on the compression device, such as moving the piston to drive a crankshaft for example. The combustion gases are typically then expelled from the combustion chamber through an exhaust of the ICE. Combustion of the fuel in the ICE, such as diesel, gasoline, ethanol, or natural gas for example, typically results in emissions being released from the exhaust, such as NOx and particulate matter (e.g. soot).

An exhaust gas after-treatment system, for example including a catalytic converter such as a three-way catalyst (TWC), may be used to convert the primary pollutants in exhaust gas from automobiles into carbon dioxide, water and nitrogen. Catalytic converters contain material which store and release oxygen (O2) to aid the conversion. The O2 storage capacity (OSC) of a catalytic converter is a measure of its ability to reduce the negative effects of rich/lean oscillations in the exhaust gas composition through catalyzing a redox (oxidation or reduction) reaction.

SUMMARY

This section provides a general summary of the disclosure, and is not a comprehensive disclosure of its full scope or all of its features.

An example vehicle according to the present disclosure includes an engine, a fueling system, an exhaust assembly, and a controller. The fueling system controls fuel to the engine. The exhaust assembly releases combustion gas from the engine and includes at least one sensor and a catalytic converter. The controller is configured to control the engine, the fueling system and the exhaust assembly. The controller evaluates engine state and an output from the at least one sensor and commands a fueling strategy to control an oxygen storage capacity of the catalytic converter based on the engine state and output from the at least one sensor.

The output from the at least one sensor may indicate a state of the oxygen storage capacity of the catalytic converter.

The state of the oxygen storage capacity may be one of full, empty, or recharging.

The at least one sensor may be a universal heated exhaust gas oxygen (UHEGO) sensor.

The at least one sensor may be disposed downstream of the catalytic converter.

The controller may evaluate a slope of the output of the at least one sensor and may command the fueling strategy based on the engine state, the output from the at least one sensor, and the slope of the output of the at least one sensor.

The controller may compare the output from the at least one sensor with at least one threshold.

An example controller for a vehicle according to the present disclosure includes a comparison module, a catalyst control module, and a fuel control module. The comparison module is configured to determine an engine state and evaluate an output from at least one sensor in an exhaust system. The catalyst control module is configured to command a fueling strategy to control an oxygen storage capacity of a catalytic converter based on the engine state and the output from the at least one sensor. The fuel control module is configured to command at least one fuel system component based on the fueling strategy from the catalyst control module.

The comparison module may determine a state of the oxygen storage capacity of the catalytic converter from the output of the at least one sensor.

The state of the oxygen storage capacity may be one of full, empty, or recharging.

The at least one sensor may be a universal heated exhaust gas oxygen (UHEGO) sensor.

The at least one sensor may be disposed downstream of the catalytic converter.

The comparison module may determine and evaluate a slope of the output of the at least one sensor, and the catalyst control module may command the fueling strategy based on the engine state, the output from the at least one sensor, and the slope of the output of the at least one sensor.

The comparison module may compare the output from the at least one sensor with at least one threshold.

An example method of controlling an engine, a fuel system, and an exhaust system of a vehicle according to the present disclosure includes: determining, by a controller, an engine state and an output of at least one sensor in an exhaust assembly; comparing, by the controller, the output of the at least one sensor with at least one threshold; determining, by the controller, a fueling strategy to control an oxygen storage capacity of a catalytic converter based on the engine state and the comparison of the output with the at least one threshold; and commanding, by the controller, at least one fuel system component based on the fueling strategy.

The method may further include determining, by the controller, an oxygen storage capacity state based on the output of the at least one sensor, wherein the state of the oxygen storage capacity is one of full, empty, or recharging.

The method may further include determining, by the controller, a slope of the output of the at least one sensor; evaluating, by the controller, whether the slope is positive or negative; and determining, by the controller, the fueling strategy based on the engine state, the output from the at least one sensor, and the slope of the output of the at least one sensor.

The method may further include determining, by the controller, the at least one threshold based on at least one engine condition.

The method may further include comparing, by the controller, the output of the at least one sensor with a first threshold and a second threshold, wherein the at least one sensor is a universal heated exhaust gas oxygen (UHEGO) sensor.

The method may further include commanding one of a normal engine state and a lean engine state as the fueling strategy, wherein the normal engine state is commanded when the state of the oxygen storage capacity is full, and the lean engine state is commanded when the state of the oxygen storage capacity is empty.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The emission control system described herein improves oxygen storage capacity (OSC) control of a catalyst by utilizing a downstream universal heated exhaust gas oxygen (UHEGO) sensor's capability of gaseous emission detection. The emission control system controls catalyst OSC more accurately to prevent over charging OSC, prevent nitrogen oxide (NOx) breakthrough, and prevent a spike in an air/fuel (A/F) ratio by monitoring the signal from the downstream UHEGO sensor. The characteristics of the downstream UHEGO sensor provide an indication for carbon monoxide (CO) emission which can be correlated to the status of OSC. By monitoring the signal from the downstream UHEGO sensor, overfilled OSC, which leads to NOx breakthrough, can be avoided.

In the present disclosure, the status of OSC (empty, recharging level, full) can be identified through the correlation of the downstream UHEGO sensor signal to CO emission. Therefore, an OSC value calculation/modeling/estimation is unnecessary, increasing reliability and decreasing cost of the exhaust assembly.

Figure 1:
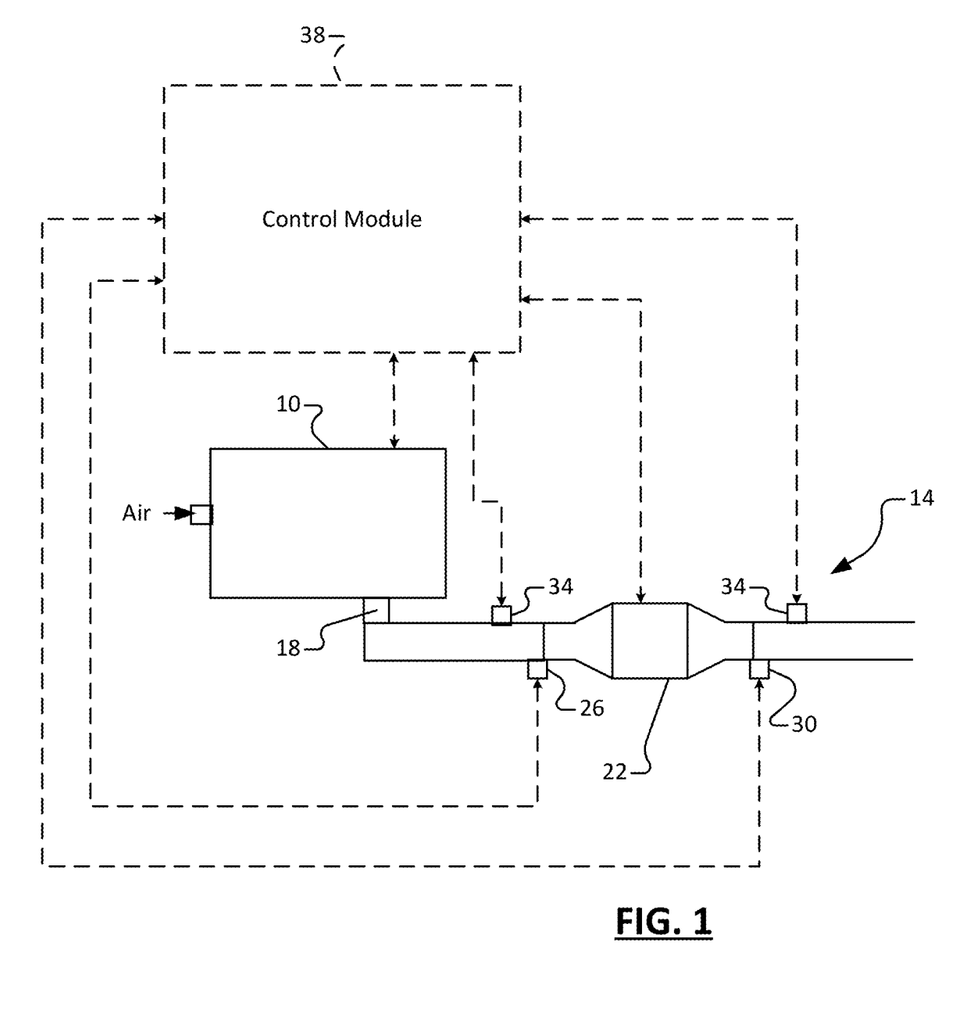
FIG. 1 is a schematic illustration of an example exhaust assembly according to the present disclosure.

Now referring to FIG. 1, an engine 10 and exhaust assembly 14 according to the present disclosure is illustrated. The engine 10 may be, for example, an internal combustion engine ("ICE"). The engine 10 may draw ambient air into a combustion chamber (not illustrated) where the air and a fuel are compressed by a compression device (not illustrated), such as a piston-cylinder for example. The air-fuel mixture may be ignited to cause combustion. The combustion gases expand to move the piston to drive a crankshaft, for example. The combustion gases may then be expelled from the combustion chamber through an exhaust port 18 of the ICE. The combustion gasses include emissions, for example nitrogen oxide (NOx), hydrocarbons (HC), carbon monoxide (CO), and particulate matter (e.g. soot).

The exhaust assembly 14 may include a catalytic converter 22, such as a three-way catalyst (TWC), to convert the primary pollutants (i.e., NOx, CO, HC, etc.) into carbon dioxide, water and nitrogen. Catalytic converters 22 decrease the emissions or pollutants by catalyzing a reaction (oxidation or reduction) to break down the emissions. For example, the TWC simultaneously reduces the NOx while oxidizing the HC and CO. Catalytic converters 22 contain material which stores and releases oxygen (O2) to aid the conversion. An Oxygen Storage Capacity (OSC) of the catalytic converter 22 indicates an amount of oxygen stored in the material of the catalytic converter 22.

The exhaust assembly 14 may further include an upstream sensor 26 and a downstream sensor 30 positioned on an upstream side of the catalytic converter 22 and a downstream side of the catalytic converter 22, respectively, to measure an air/fuel ratio before and after the catalytic converter 22. For example, the upstream sensor 26 and the downstream sensor 30 may each be lambda sensors, or universal heated exhaust gas oxygen (UHEGO) sensors.

Additional sensors 34 may also be placed upstream and downstream from the catalytic converter 22. For example, the additional sensors 34 may measure CO emissions, NOx emissions, HC emissions, particulate matter, etc.

A control module 38 may communicate with the various sensors 26, 30, 34 to control the components of the engine 10 and exhaust assembly 14. In this application, the term "module" or "unit" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 2:
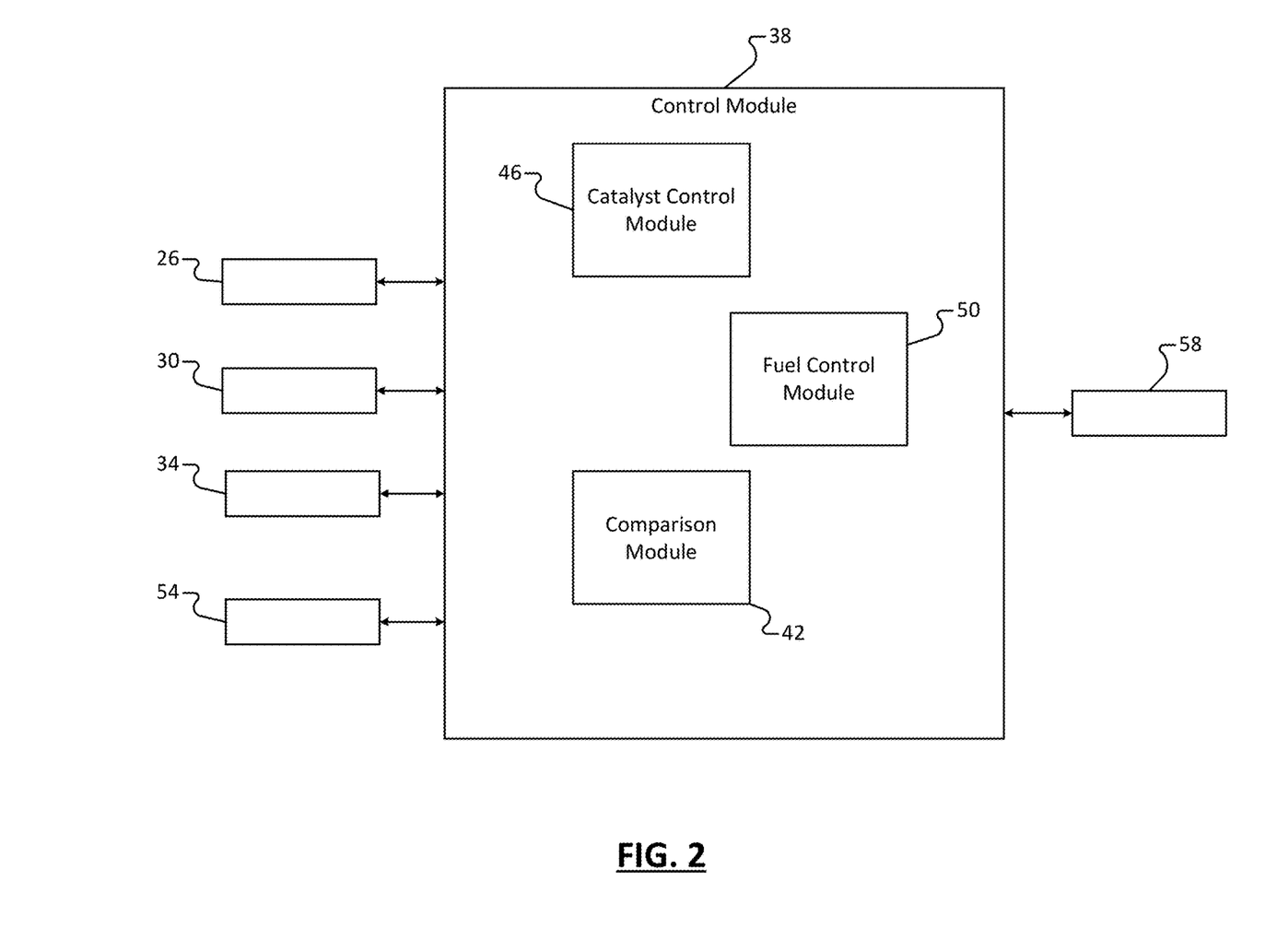
FIG. 2 is a schematic illustration of an example control module of the exhaust assembly of FIG. 1.

Now referring to FIG. 2, the control module 38 may include a comparison module 42, a catalyst control module 46, and a fuel control module 50. The comparison module 42 may communicate with sensors 26, 30, 34 and various other sensors or inputs 54 (for example, vehicle speed, steering wheel position, engine speed, engine load, etc) to determine a current engine condition. Although it is not necessary, in some embodiments sensors/inputs 54 may be communicated to the control module 38 through a control area network (CAN) or other vehicle communication network. For example, sensors/inputs 54, a comparison of outputs of the downstream UHEGO sensor 30 and/or sensors 34, or a combination of these may provide a current engine control state (such as normal or lean, for example).

The comparison module 42 may compare an output signal from the downstream UHEGO sensor 30 to a plurality thresholds, A and B. The thresholds A and B may indicate a change from normal operation to lean operation or a change from lean operation to normal operation. The thresholds A and B may be determined based on engine testing data.

Figure 3:
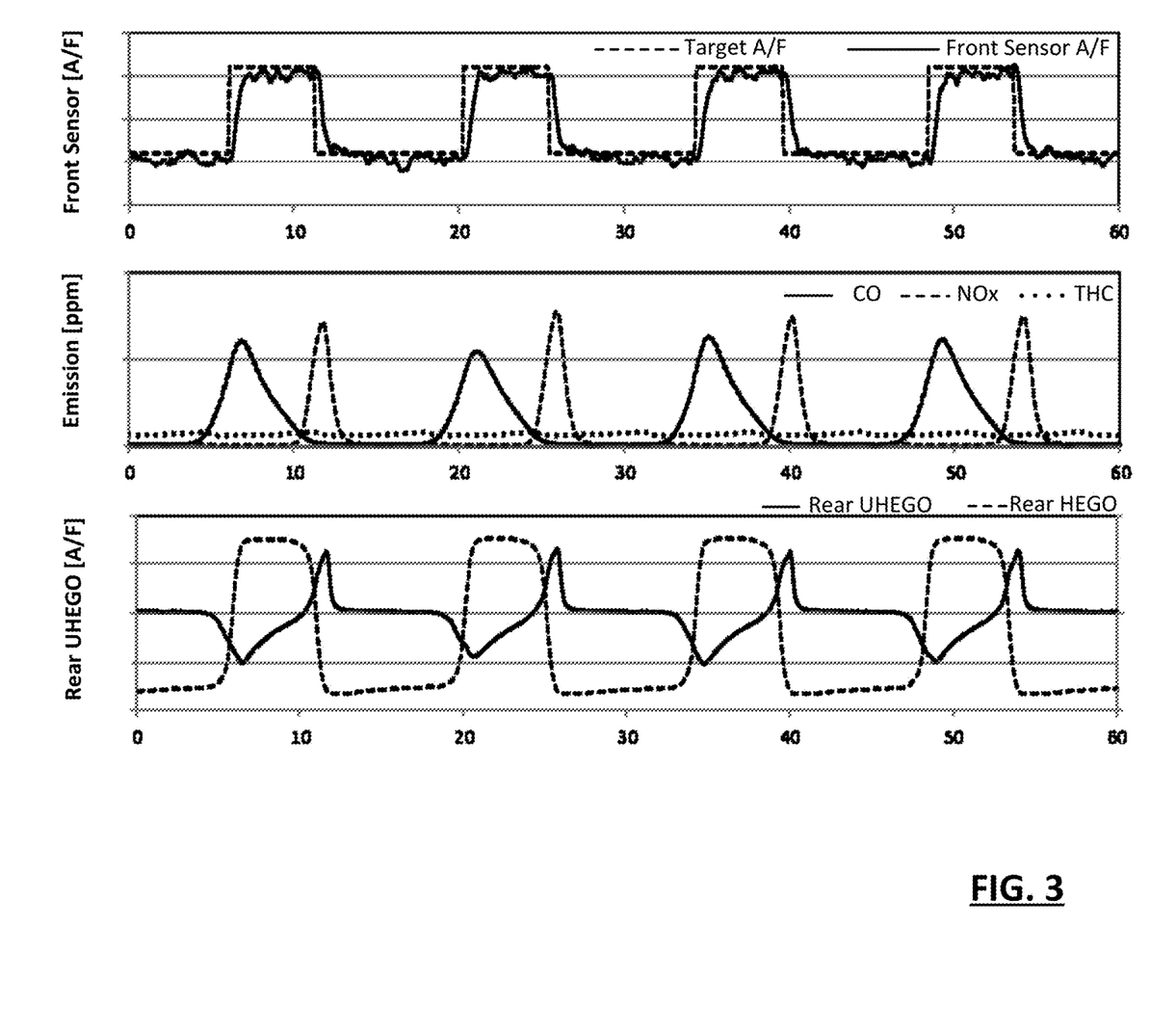
FIG. 3 is a graphical representation of the output signals of various sensors of the exhaust assembly of FIG. 1.

For example, referring to FIG. 3, during a lean-to-rich switching test, the following observations are possible: (1) a shape of a CO emission curve is inversely similar to a shape of a curve representing the output signal of the downstream UHEGO sensor 30, and (2) the increasing CO emission indicates that oxygen stored in catalyst is depleted and OSC is empty while the decreasing CO emission indicates that oxygen stored in the catalyst is increased and OSC is being recharged. As such, an output of the downstream UHEGO sensor 30 may be used as an indicator for the status of OSC. Alternatively, an inflection point may be used as an indicator for the status of OSC. The inflection point may be the value where the slope of the signal of the downstream UHEGO sensor 30 changes from negative to positive.

Figure 4:
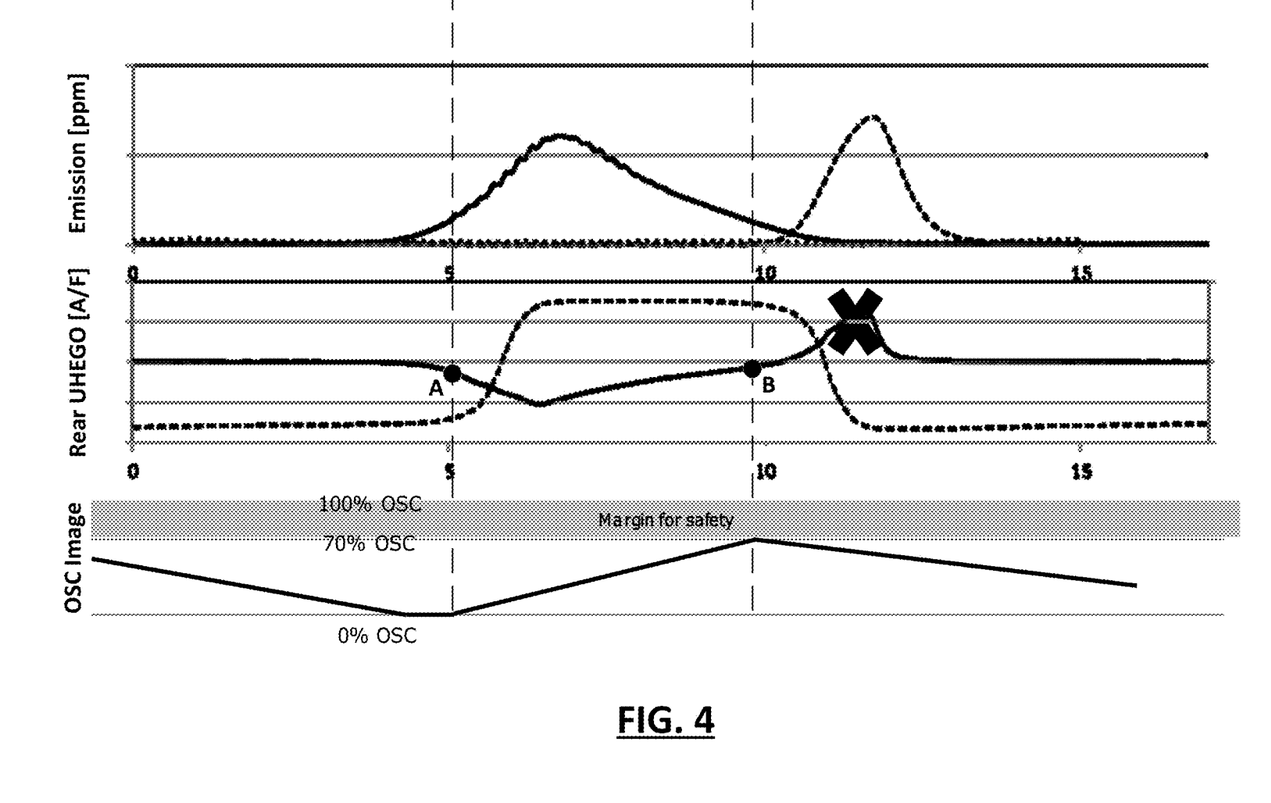
FIG. 4 is another graphical representation of the output signals of various sensors of the exhaust assembly of FIG. 1.

Accordingly, referring to FIG. 4, the threshold A may indicate when the OSC is empty and needs to be recharged, while the threshold B may indicate when the OSC is recharged to a particular level (which includes a safety margin to full-charge). When the signal of the downstream UHEGO sensor 30 drops below threshold A while the fuel is controlled in the normal state (i.e., while in stoichiometric Air-Fuel-Ratio, AFR, control), the signal may indicate an empty OSC. Additionally, when the signal of the downstream UHEGO sensor 30 increases above threshold B while the fuel is controlled in a lean state (i.e. lean AFR control), the signal may indicate a recharged OSC.

The values of A and B may be different for each engine condition (i.e., may be specific for each engine operating point). For example, the values of A and B may differ depending on speed, load, etc. To account for the different engine conditions, a set of coefficients Ki may be compiled as a function of engine condition (speed, load, etc.). The values A and B may then be determined from the following equations:

$$A = Ka * A_{Original}$$

$$B = Ka * B_{Original}$$

Returning to FIG. 2, the catalyst control module 46 may communicate with the comparison module 42 and command a control state based on the output from the comparison module 42. For example, if the comparison module 42 determines that OSC is empty, for example, when the signal of the downstream UHEGO sensor 30 drops below threshold A while the fuel is controlled in the normal state (i.e., while in stoichiometric Air-Fuel-Ratio, AFR, control), the catalyst control module 46 may command a control state change to lean AFR control to recharge the OSC. Further, if the comparison module 42 determines that OSC is recharged, for example, when the signal of the downstream UHEGO sensor 30 increases above threshold B while the fuel is controlled in a lean state (i.e. lean AFR control), the catalyst control module 46 may command a control state change to normal control (i.e., stoichiometric AFR control) to prevent OSC from further charging, prevent NOx breakthrough, and prevent a spike in AFR.

For example, in FIG. 4, if the catalyst control module 46 commands a control state change to normal control when the output from the downstream UHEGO sensor 30 crosses the threshold B, the spike following the threshold B is reduced or eliminated, as shown by the X-ed portion. Instead, the output from the downstream UHEGO sensor 30 would gradually ramp back to approximately 14.5 A/F. The spike, or X-ed portion indicates over-charge of the OSC which can lead to NOx breakthrough. Therefore, with the spiked portion eliminated (as shown with the X), over-charge of the OSC and NOx breakthrough is also eliminated.

Returning to FIG. 2, the fuel control module 50 may communicate with the catalyst control module 46 and command various fueling components 58 (such as fuel pumps, fuel injectors, etc.) to operate in the commanded state provided by the catalyst control module 46. For example, if the catalyst control module 46 commands a lean engine state, the fuel control module 50 may operate under lean control and command the various components 58 to a leaner air-fuel mixture (i.e. a higher air fuel ratio, AFR). Further, if the catalyst control module 46 commands a normal engine state, the fuel control module 50 may operate under normal control and command the various components 58 to a more stoichiometric air-fuel mixture (i.e. a stoichiometric air fuel ratio, AFR, of around 14.7:1).

Figure 5:
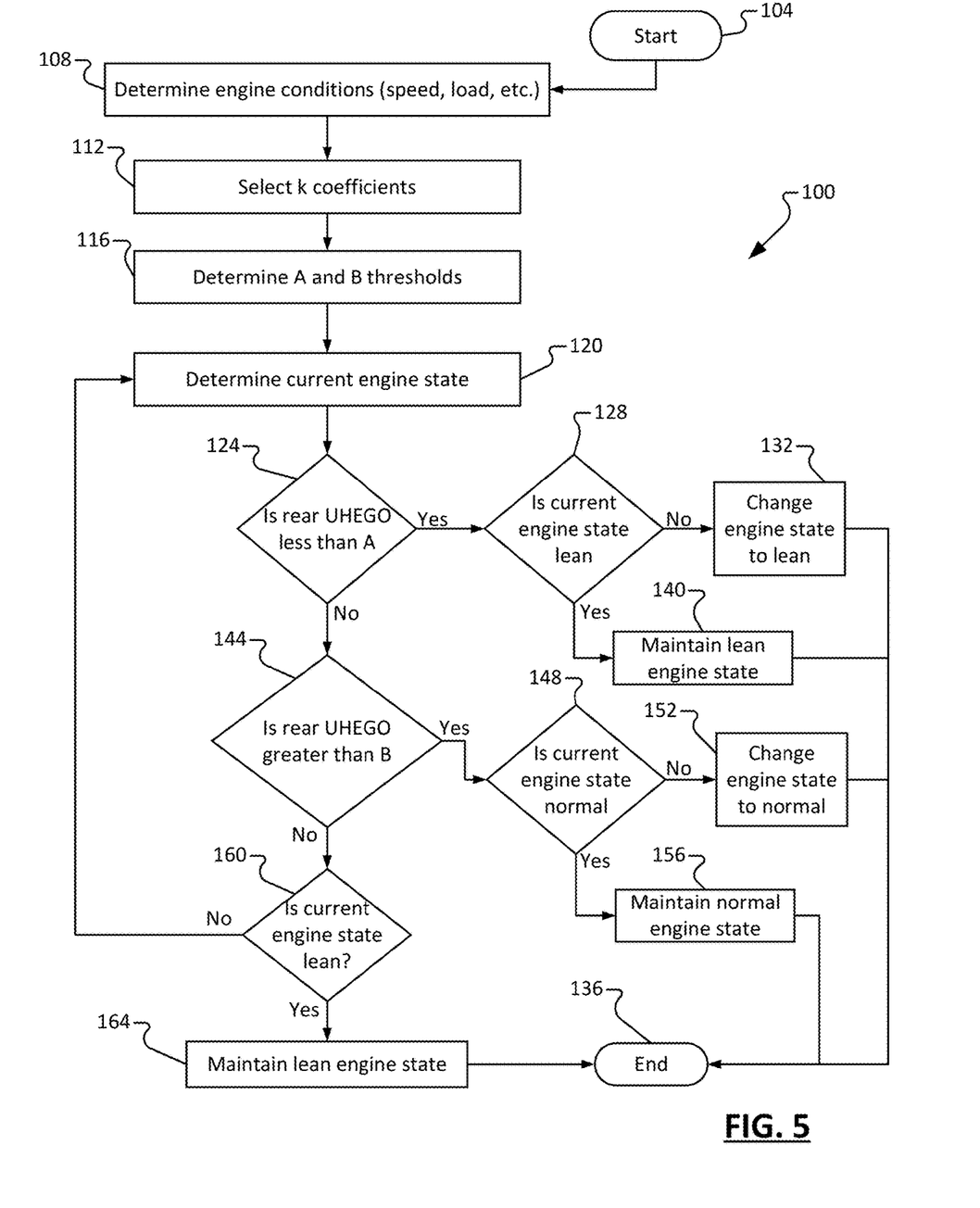
FIG. 5 is a flow diagram for operation of an example method for catalyst control according to the present disclosure.

Now referring to FIG. 5, an example method 100 for catalyst control is illustrated. Method 100 starts at 104. At 108, the engine conditions (for example, speed, load, etc.) are determined. For example only the engine conditions may be determined by the control module 38 and based on outputs from sensors 26, 30, 34 and various other sensors or inputs 54 (for example, vehicle speed, steering wheel position, engine speed, engine load, etc). In some embodiments, sensors/inputs 54, a comparison of outputs of the downstream UHEGO sensor 30 and/or sensors 34, or a combination of these may provide a current engine control state (such as normal or lean, for example).

At 112, coefficients (Ki) are determined to alter an original A and B threshold to thresholds A and B that accurately represent the specific engine condition. For example, the set of coefficients Ki may be compiled as a function of engine condition (speed, load, etc.) and may be stored as a map, array, or otherwise in the control module 38.

At 116, the thresholds A and B are determined based on the original A and B thresholds and the coefficients Ki. For example, the values A and B may be determined from the following equations:

$$A = Ka * A_{Original}$$

$$B = Ka * B_{Original}$$

At 120, the current engine state is determined. For example, the control module 38 may determine the current engine state based on the current fueling control, such as lean control or normal, stoichiometric, control. Stoichiometric control may be when an AFR is approximately 14.7:1 (14.7 parts of air to one part of fuel). A lower AFR number contains less air than the stoichiometric AFR, and is therefore a richer mixture and linked with rich control. A higher AFR number contains more air than the stoichiometric AFR, and is therefore a leaner mixture and linked with lean control.

At 124, method 100 determines whether the output from the downstream, or rear, UHEGO sensor 30 is less than threshold A. For example, threshold A may be a number signifying that the AFR is ramping down (having a negative slope) and the OSC is empty and needs to be recharged. In some embodiments, an example number for threshold A may be within a range of 14.0 to 14.5, and more particularly within a range of 14.3 to 14.45.

If true, method 100 determines whether a current engine state is lean at 128. In some embodiments, a normal engine state may be stoichiometric control and a lean engine state may have a leaner air-fuel mixture and a higher AFR number (contains more air than the stoichiometric AFR). If false, the engine state is changed to lean control at 132. For example, the catalyst control module 46 may command the fuel control module 50 to operate the fueling system in lean control. The method ends at 136.

If true at 128, the engine state is maintained in lean control at 140. The method then ends at 136.

If false at 124, method 100 determines whether the output from the downstream, or rear, UHEGO sensor 30 is greater than threshold B. For example, threshold B may be a number indicating that the AFR is ramping up (having a positive slope) and the OSC is recharged (less a margin of safety, for example, approximately 30%). As such, the threshold B value may be set within a range of 60%-80% of the total OSC, and more particularly at 70% of the total OSC. In some embodiments, an example number for threshold B may be within a range of 14.0 to 14.5, and more particularly within a range of 14.4 to 14.5.

If true, method 100 determines whether a current engine state is normal at 148. As previously stated, in some embodiments, a normal engine state may be stoichiometric control. If false, the engine state is changed to normal control at 152. For example, the catalyst control module 46 may command the fuel control module 50 to operate the fueling system in normal (i.e., stoichiometric) control. The method then ends at 136.

If true at 148, the engine state is maintained in normal control at 156. The method then ends at 136.

If false at 144, the method 100 determines whether a current engine state is lean at 160. As previously stated, in some embodiments, a lean engine state may have a leaner air-fuel mixture and a higher AFR number (contains more air than the stoichiometric AFR). If false, the method returns to 120. If true at 160, the engine state is maintained in lean control at 164. The method then ends at 136.

Figure 6A:
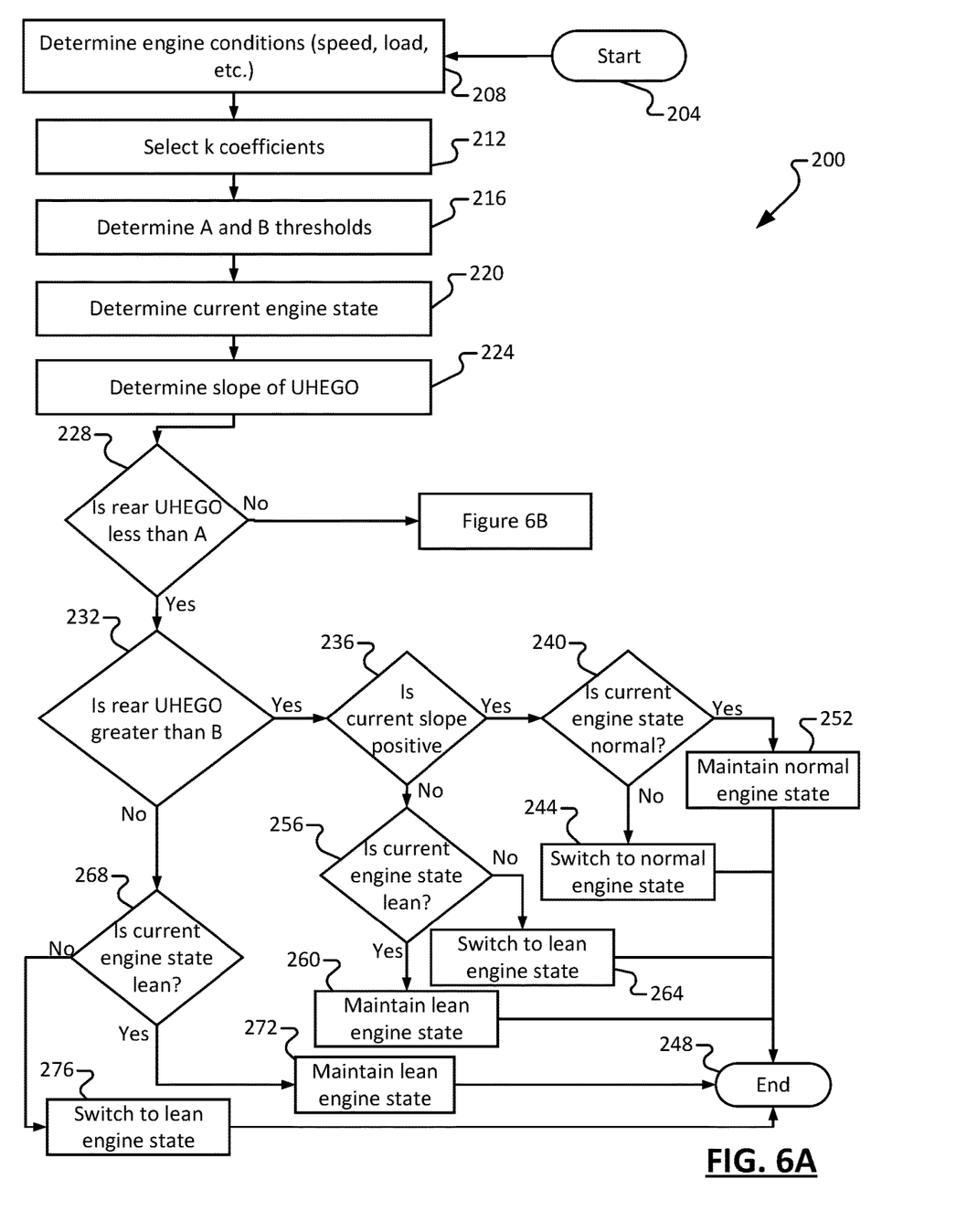
FIGS. 6A and 6B are flow diagrams for operation of another example method for catalyst control according to the present disclosure.
Figure 6B:
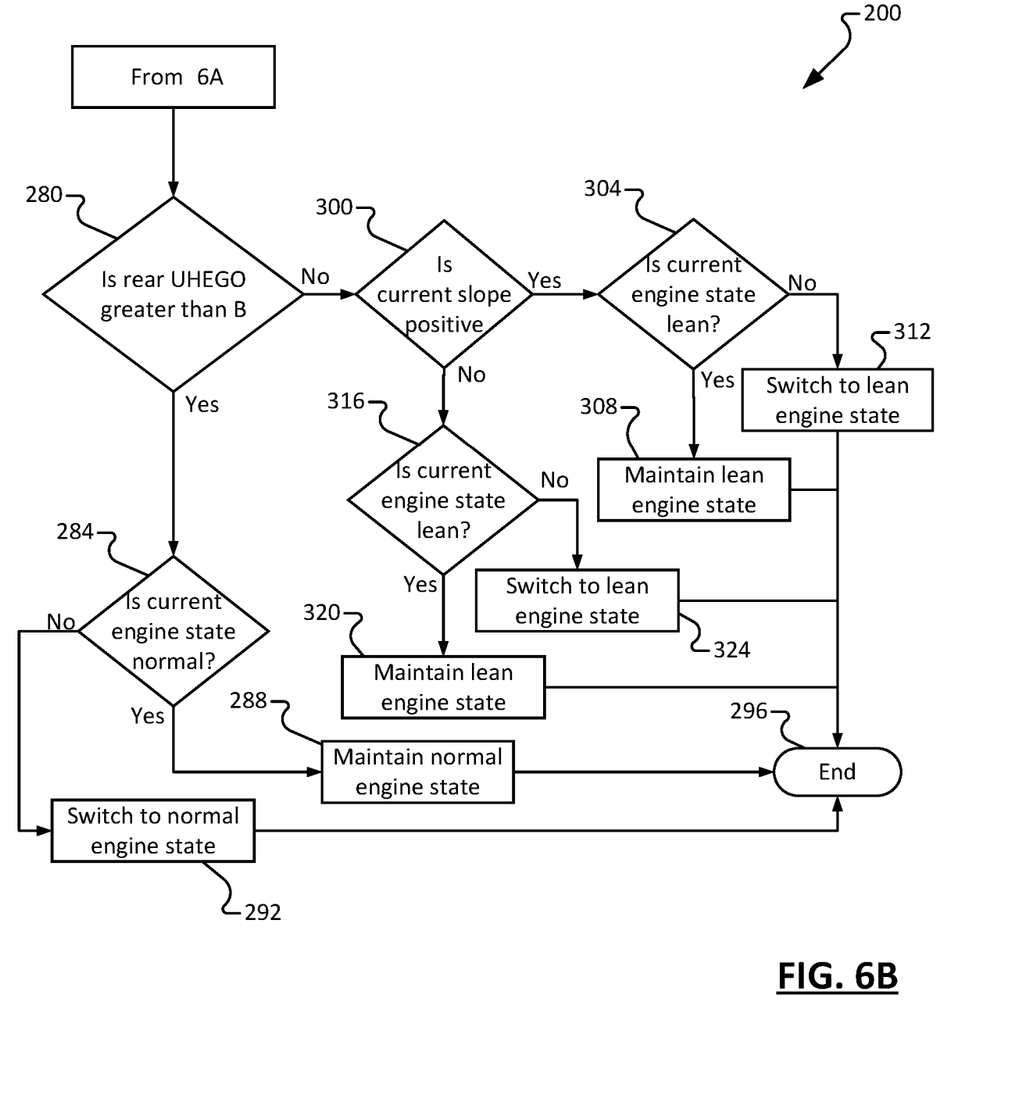

Now referring to FIGS. 6A and 6B, another example method 200 for catalyst control is illustrated. Method 200 starts at 204. At 208, the engine conditions (for example, speed, load, etc.) are determined. For example only the engine conditions may be determined by the control module 38 and based on outputs from sensors 26, 30, 34 and various other sensors or inputs 54 (for example, vehicle speed, steering wheel position, engine speed, engine load, etc). In some embodiments, sensors/inputs 54, a comparison of outputs of the downstream UHEGO sensor 30 and/or sensors 34, or a combination of these may provide a current engine control state (such as normal or lean, for example).

At 212, coefficients (Ki) are determined to alter an original A and B threshold to thresholds A and B that accurately represent the specific engine condition. For example, the set of coefficients Ki may be compiled as a function of engine condition (speed, load, etc.) and may be stored as a map, array, or otherwise in the control module 38.

At 216, the thresholds A and B are determined based on the original A and B thresholds and the coefficients Ki. For example, the values A and B may be determined from the following equations:

$$A = Ka * A_{Original}$$

$$B = Ka * B_{Original}$$

At 220, the current engine state is determined. For example, the control module 38 may determine the current engine state based on the current fueling control, such as lean control or normal, stoichiometric, control. Stoichiometric control may be when an AFR is approximately 14.7:1 (14.7 parts of air to one part of fuel). A lower AFR number contains less air than the stoichiometric AFR, and is therefore a richer mixture and linked with rich control. A higher AFR number contains more air than the stoichiometric AFR, and is therefore a leaner mixture and linked with lean control.

At 224, the slope of the output signal of the downstream, or rear, UHEGO sensor 30 is determined. In some embodiments, the comparison module 42 or the catalyst control module 46 may determine the slope of the output of the downstream UHEGO sensor 30. For example only, the control module 38 may analyze a prior period (such as within a range of 0.01-1 second, or, more specifically, within a range of 0.1-0.3 seconds) to determine the slope.

At 228, method 200 determines whether the output from the downstream, or rear, UHEGO sensor 30 is less than threshold A. For example, threshold A may be a number signifying that the AFR is ramping down (having a negative slope) and the OSC is empty and needs to be recharged. In some embodiments, an example number for threshold A may be within a range of 14.0 to 14.5, and more particularly within a range of 14.3 to 14.45.

If true, method 200 determines whether the output from the downstream, or rear, UHEGO sensor 30 is greater than threshold B at 232. For example, threshold B may be a number indicating that the AFR is ramping up (having a positive slope) and the OSC is recharged (less a margin of safety, for example, approximately 30%). As such, the threshold B value may be set within a range of 60%-80% of the total OSC, and more particularly at approximately 70% of the total OSC. In some embodiments, an example number for threshold B may be within a range of 14.0 to 14.5, and more particularly within a range of 14.4 to 14.5.

If true at 232, method 200 determines whether the slope is positive at 236. For example, the control module 38 may evaluate the slope from 224 and determine whether the value is positive. If true, method 200 determines whether a current engine state is normal at 240. As previously stated, in some embodiments, a normal engine state may be stoichiometric control. If false, the engine state is changed to normal control at 244. For example, the catalyst control module 46 may command the fuel control module 50 to operate the fueling system in normal (i.e., stoichiometric) control. The method then ends at 248.

If true at 240, the normal engine state is maintained at 252. The method 200 then ends at 248.

If false at 236, method 200 determines whether the current engine state is lean at 256. As previously stated, in some embodiments, a lean engine state may have a leaner air-fuel mixture and a higher AFR number (contains more air than the stoichiometric AFR). If true, the method 200 maintains the lean engine state at 260. The method then ends at 248.

If false at 256, the control module 38 switches the engine state to lean control at 264. The method then ends at 248.

If false at 232, method 200 determines whether the current engine state is lean at 268. As previously stated, in some embodiments, a lean engine state may have a leaner air-fuel mixture and a higher AFR number (contains more air than the stoichiometric AFR). If true, the method 200 maintains the lean engine state at 272. The method then ends at 248.

If false at 268, the control module 38 switches the engine state to lean control at 276. The method then ends at 248.

Returning to 228, if false (i.e., the rear UHEGO is not less than threshold A), method 200 proceeds to FIG. 7B. At 280, method 200 determines whether the output from the downstream, or rear, UHEGO sensor 30 is greater than threshold B. For example, threshold B may be a number indicating that the AFR is ramping up (having a positive slope) and the OSC is recharged (less a margin of safety, for example, approximately 30%). As such, the threshold B value may be set within a range of 60%-80% of the total OSC, and more particularly at approximately 70% of the total OSC. In some embodiments, an example number for threshold B may be within a range of 14.0 to 14.5, and more particularly within a range of 14.4 to 14.5.

If true at 280, method 200 determines whether the current engine state is normal at 284. As previously stated, in some embodiments, a normal engine state may be stoichiometric control. If true, the method 200 maintains the normal engine state at 288. The method then ends at 296.

If false at 284, the control module 38 switches the engine state to normal control at 292. For example, the catalyst control module 46 may command the fuel control module 50 to operate the fueling system in normal (i.e., stoichiometric) control. The method then ends at 296.

If false at 280, method 200 determines whether the slope is positive at 300. For example, the control module 38 may evaluate the slope from 224 and determine whether the value is positive. If true, method 200 determines whether a current engine state is lean at 304. As previously stated, in some embodiments, a lean engine state may have a leaner air-fuel mixture and a higher AFR number (contains more air than the stoichiometric AFR). If true, the engine state is maintained in lean engine control at 308. The method then ends at 296.

If false at 304, the control module 38 switches to lean engine control at 312. For example, the catalyst control module 46 may command the fuel control module 50 to operate the fueling system in lean (i.e., greater than stoichiometric) control. The method 200 then ends at 296.

If false at 300, method 200 determines whether the current engine state is lean at 316. As previously stated, in some embodiments, a lean engine state may have a leaner air-fuel mixture and a higher AFR number (contains more air than the stoichiometric AFR). If true, the method 200 maintains the lean engine state at 320. The method then ends at 296.

If false at 316, the control module 38 switches the engine state to lean control at 324. The method then ends at 296.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
an engine;
a fueling system controlling fuel to the engine;
an exhaust assembly releasing combustion gas from the engine, the exhaust assembly including:
a catalytic converter, and
a universal heated exhaust gas oxygen (UHEGO) sensor disposed downstream at an exit of the catalytic converter; and
a controller configured to control the engine, the fueling system and the exhaust assembly,
wherein the controller is configured to determine a current engine state, perform a first comparison between an output from the UHEGO sensor with a first threshold, and command a fueling strategy to control an oxygen storage capacity of the catalytic converter based on the current engine state and the first comparison.

2. The vehicle of claim 1, wherein the output from the UHEGO sensor indicates a state of the oxygen storage capacity of the catalytic converter.

3. The vehicle of claim 2, wherein the state of the oxygen storage capacity is one of full, empty, or recharging.

4. The vehicle of claim 1, wherein the controller evaluates a slope of the output of the UHEGO sensor and commands the fueling strategy based on the engine state, the output from the UHEGO sensor, and the slope of the output of the UHEGO sensor.

5. The vehicle of claim 1, wherein if the output of the UHEGO sensor is not less than the first threshold, the controller compares the output from the UHEGO sensor with a second threshold.

6. The vehicle of claim 5, wherein when the output of the UHEGO sensor is less than the first threshold, the controller determines that the oxygen storage capacity is empty, and when the output of the UHEGO sensor is greater than the second threshold, the controller determines that the oxygen storage capacity is recharged to a preset threshold.

7. The vehicle of claim 1, wherein when the output of the UHEGO sensor is less than the first threshold and the fueling strategy is a stoichiometric state, the output of the UHEGO sensor indicates that the oxygen storage capacity is empty.

8. The vehicle of claim 1, wherein when the output of the UHEGO sensor is less than the first threshold and the fueling strategy is a stoichiometric state, the controller is configured to command a control state change to lean fueling to recharge the oxygen storage capacity.

9. The vehicle of claim 1, wherein the output of the UHEGO sensor indicates a carbon monoxide emission.

10. A controller for a vehicle comprising:
   a comparison module configured to determine a current engine state and perform, a first comparison between an output from a universal heated exhaust gas oxygen (UHEGO) sensor with a first threshold in an exhaust system, the UHEGO sensor being disposed at a downstream exit of a catalytic converter;
   a catalyst control module configured to command a fueling strategy to control an oxygen storage capacity of the catalytic converter based on the current engine state and the first comparison; and
   a fuel control module configured to command at least one fuel system component based on the fueling strategy from the catalyst control module.

11. The controller of claim 10, wherein the comparison module determines a state of the oxygen storage capacity of the catalytic converter based on the output of the UHEGO sensor.

12. The controller of claim 11, wherein the state of the oxygen storage capacity is one of full, empty, or recharging.

13. The controller of claim 10, wherein the comparison module determines and evaluates a slope of the output of the UHEGO sensor and the catalyst control module commands the fueling strategy based on the current engine state, the output from the UHEGO sensor, and the slope of the output of the UHEGO sensor.

14. The controller of claim 10, wherein if the output of the UHEGO sensor is not less than the first threshold, the comparison module compares the output from the UHEGO sensor with a second threshold.

15. A method of controlling an engine, a fuel system, and an exhaust system of a vehicle, the method comprising:
   determining, by a controller, a current engine state and an output of a universal heated exhaust gas oxygen (UHEGO) sensor in an exhaust assembly, the UHEGO sensor being disposed at a downstream exit of a catalytic converter;
   comparing, by the controller, the output of the UHEGO sensor with at a first threshold;
   determining, by the controller, a fueling strategy to control an oxygen storage capacity of the catalytic converter based on the current engine state and the comparison of the output with the first threshold; and
   commanding, by the controller, at least one fuel system component based on the fueling strategy.

16. The method of claim 15, further comprising:
   determining, by the controller, an oxygen storage capacity state based on the output of the UHEGO sensor, wherein the state of the oxygen storage capacity is one of full, empty, or recharging.

17. The method of claim 15, further comprising:
   determining, by the controller, a slope of the output of the UHEGO sensor;
   evaluating, by the controller, whether the slope is positive or negative; and
   determining, by the controller, the fueling strategy based on the current engine state, the output from the UHEGO sensor, and the slope of the output of the UHEGO sensor.

18. The method of claim 15, further comprising:
   determining, by the controller, the first threshold based on at least one engine condition.

19. The method of claim 15, further comprising:
   comparing, by the controller, the output of the UHEGO sensor with a second threshold if the output of the UHEGO sensor is not less than the first threshold.

20. The method of claim 15, further comprising:
   commanding one of a normal engine state and a lean engine state as the fueling strategy, wherein the normal engine state is a stoichiometric engine state, the normal engine state is commanded when the state of the oxygen storage capacity is full, and the lean engine state is commanded when the state of the oxygen storage capacity is empty.

* * * * *

UNITED STATES PATENT AND TRADEMARK OFFICE
CERTIFICATE OF CORRECTION

PATENT NO. : 10,603,634 B1
APPLICATION NO. : 16/162952
DATED : March 31, 2020
INVENTOR(S) : Han-Yuan Chang et al.

Page 1 of 1

It is certified that error appears in the above-identified patent and that said Letters Patent is hereby corrected as shown below:

On the Title Page

Column 1, item (22) Filed, Line 1: After "2018", insert --¶(65) Prior Publication Data US 2020/0122086 A1 Apr. 23, 2020--

In the Claims

Column 13, Claim 10, Line 18: Delete "perform," and insert --perform-- therefor

Column 14, Claim 15, Line 9: After "with", delete "at"

Signed and Sealed this
Ninth Day of June, 2020

Andrei Iancu
*Director of the United States Patent and Trademark Office*